June 2, 1942.  R. E. MARBURY  2,284,876
PROTECTIVE SYSTEM FOR SERIES CAPACITORS
Filed April 24, 1940
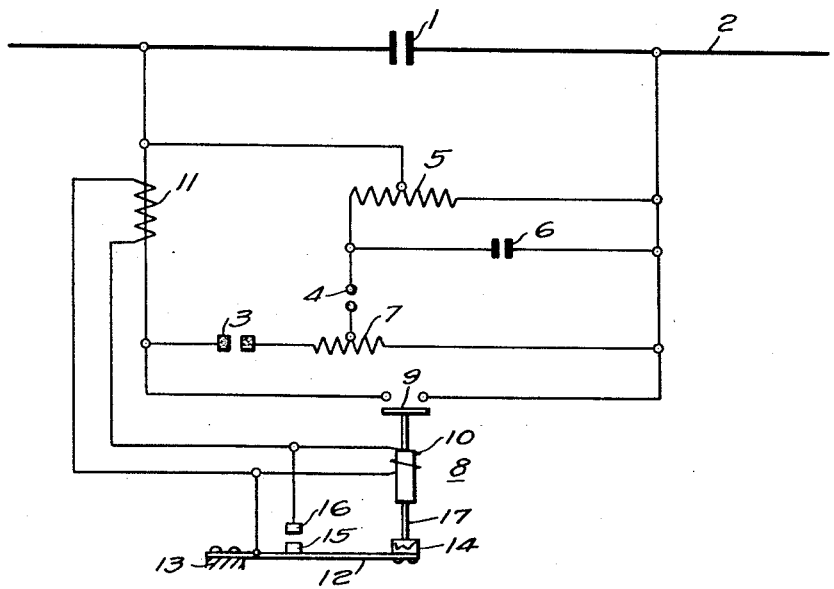
WITNESSES:
INVENTOR
Ralph E. Marbury.
BY
ATTORNEY Patented June 2, 1942

2,284,876

UNITED STATES PATENT OFFICE 2,284,876

PROTECTIVE SYSTEM FOR SERIES CAPACITORS

Ralph E. Marbury, Wilkinsburg, Pa., assignor to Westinghouse Electric & Manufacturing Company, East Pittsburgh, Pa., a corporation of Pennsylvania Application April 24, 1940, Serial No. 331,355

7 Claims. (Cl. 175—294)

The present invention relates to protective systems for series capacitors, or similar devices, for the purpose of protecting them against overvoltages caused by abnormal line currents.

Capacitors are sometimes connected in series with alternating current transmission or distribution lines to neutralize some or all of the line inductance, and thus improve the voltage regulation of the line and the stability of the system. Capacitors are also sometimes connected in series with certain types of electrical apparatus, such as electric furnaces and welders, in order to neutralize part of the inductance of the apparatus and of the circuit to which it is connected, thus improving the operation. Since such capacitors are connected in series with the line, they carry the line current and the voltage across the capacitor is proportional to the current. For this reason, very high voltages may appear across the capacitor in case of a short circuit on the line or a very heavy overload causing an abnormally high current.

Capacitors of the type used as series capacitors are usually designed to withstand an overvoltage of 150% of the rated voltage for very brief periods and momentary overvoltages of 200%, and it is necessary to provide some protective means for shunting the capacitor if the voltage exceeds this value even for an instant. Since the shunting device must operate substantially simultaneously with the occurrence of the overvoltage in order to provide the necessary protection, spark gaps or other discharge devices are usually utilized for this purpose, and it is usually desirable to shunt the gap or discharge device as soon as it breaks down in order to prevent damage to the gap, since the current traversing it may be very large. It is also desirable to keep the cost of the protective equipment as low as possible, since there are many applications for series capacitors in which relatively small capacitor units are required, and the use of series capacitors for such applications has been seriously restricted because of the high cost of the available protective equipment, which in many cases has been more than the cost of the capacitor itself.

An object of the present invention is to provide a simple and inexpensive protective system for series capacitors, using a gap device which shunts the capacitor when an overvoltage occurs and having means for shunting the gap immediately after it has broken down.

A further object of the invention is to provide a protective system for series capacitors, using a gap device which shunts the capacitor when an overvoltage occurs together with means for shunting the gap immediately after it has broken down, and having a simple and inexpensive means for removing the shunt to restore the capacitor to service after a definite time interval.

A more specific object of the invention is to provide a protective system for series capacitors having a gap device to shunt the capacitor when an overvoltage occurs and means for shunting the gap immediately after it has broken down, and in which a simple vibratory type of timing device is used to remove the shunt and restore the capacitor to service after a predetermined time.

The invention will be more fully understood from the following detailed description, taken in connection with the accompanying drawing, the single figure of which is a schematic diagram showing a preferred embodiment of the invention.

The invention is shown in the drawing as applied for the protection of a series capacitor 1 connected in series with an alternating current line 2. The line 2 may be one phase of a three-phase transmission or distribution line, or it may be a part of the supply circuit for an electrical device such as a furnace or a welder, or it may be any other alternating current line in which it is desired to introduce series capacitance.

The capacitor 1 is protected against overvoltages by a main spark gap device 3 which is connected across the capacitor 1 so that the capacitor is shunted when the gap breaks down. The gap device 3 is preferably of the type described in the patent to R. E. Marbury and W. H. Cuttino, No. 2,144,503, issued January 17, 1939, and assigned to Westinghouse Electric & Manufacturing Company. This gap has massive carbon electrodes having large heat storage capacity in order to prevent overheating of the electrodes so that it is capable of carrying heavy currents, and it has a low recovery voltage which prevents the building up of oscillatory voltages in the circuit consisting of the capacitor 1 and gap 3.

Since it is very difficult to accurately calibrate a gap of this type for a low breakdown voltage and to maintain its calibration unchanged after it has been in service, the gap 3 is preferably set for a breakdown voltage which is considerably higher than the maximum voltage which can be allowed across the capacitor 1, and the gap 3 is tripped off by means of an auxiliary spark gap 4 and an auxiliary oscillatory circuit, thus avoiding the necessity of accurate calibration. The auxiliary gap and oscillatory circuit are described and claimed in the patent to R. E. Marbury, No. 2,072,717, issued March 2, 1937, and assigned to the Westinghouse Electric & Manufacturing Company. As described in the patent, the gap 4 preferably has metal electrodes so as to be capable of rather sensitive calibration, and in order to avoid the difficulty of accurately adjusting this gap for very low breakdown voltages, it is set for a considerably higher voltage than the maximum permissible voltage across the capacitor 1 and the voltage applied to the gap is stepped up by means of a small auto-transformer 5 which is connected across the capacitor 1. The gap 4 is connected in an auxiliary oscillatory circuit consisting of a small capacitor 6 and an air core inductance 7 which may consist merely of a few turns of wire in air. The inductance 7 is also connected in the circuit of the main gap device 3 so that when the auxiliary gap 4 has broken down the high oscillatory voltage of high frequency which is set up in the auxiliary circuit consisting of the capacitor 6 and inductance 7 is applied to the main gap 3 to cause it to break down.

It is desirable to by-pass the main gap device 3 immediately after it has broken down in order to prevent burning of the electrodes and damage to surrounding structures by the arc since it may carry very heavy currents, and for this purpose a contactor 8 is provided having its contacts 9 connected in a shunt circuit around the gap 3. The contactor 8 has an operating coil 10 which is energized from a current transformer 11 connected in the circuit of the main gap 3, so that the contactor is energized and closes its contacts as soon as the gap breaks down and permits current to flow through the transformer 11.

The shunt circuit completed by the contacts 9 by-passes the line current around the capacitor 1 to protect it from the high voltage that would be caused by the short circuit or overload current, and this shunt must be removed as soon as possible to restore the capacitor to service. Since in most cases a short circuit on the line will be cleared by the usual protective devices within a very short time, the shunt may be removed after a suitable time interval by means of a timing device. For this purpose a simple vibratory type of timing element may be used which, as shown in the drawing, consists of a thin steel reed 12 rigidly secured to a fixed support 13 at one end and having a weight 14 secured to its free end. The reed 12 has a contact 15 mounted on it which is adapted to engage a relatively fixed contact 16. The contacts 15 and 16 are connected to opposite sides of the operating coil 10 of the contactor 8 so that when they are closed the coil is short circuited. The reed 12 is arranged so that when the contactor is deenergized with its contacts 9 open, the reed is held stationary with the contacts 15, 16 separated in the position shown in the drawing. A suitable arrangement for this purpose is shown diagrammatically and utilizes a plunger member 17 on the contactor which engages the weight 14 when the contactor is deenergized and holds the reed 12 in the desired position. When the contactor is energized and closes its contacts, the member 17 releases the reed 12, permitting it to vibrate until it comes to rest with the contacts 15, 16 closed.

The operation of this system should now be apparent. In case of a short circuit on the line 2 or a very heavy overload causing an abnormally high line current, the auxiliary gap 4 will break down as soon as the voltage across the capacitor 1 reaches 200% of the rated voltage. When the gap 4 breaks down, a high oscillatory voltage of high frequency is set up in the auxiliary oscillatory circuit consisting of the capacitor 6 and inductance 7, and since the inductance is connected in the circuit of the main gap 3, this oscillatory voltage is applied to the main gap and causes it to break down. The capacitor 1 is thus shunted by the gap and the line current flows through the shunt circuit of the gap 3. Since the current transformer 11 is connected in this circuit, it is traversed by the gap current and energizes the operating coil 10 of the contactor 8, causing it to close its contacts 9 and complete a shunt circuit around both the capacitor 1 and the gap 3. The voltage across the gap 3 immediately falls to substantially zero, extinguishing the arc, so that the heavy line current flows entirely through the shunt circuit established by closing of the contacts 9. Since this current traverses transformer 11, the coil 10 is maintained energized and the contacts 9 are held closed, thus protecting the capacitor 1 from overvoltage.

As soon as the contactor 8 closes its contacts 9, the weighted reed 12 is released and starts vibrating, rapidly closing and opening the contacts 15 and 16. This rapid making and breaking of these contacts does not affect the energization of the coil 10 sufficiently to cause the contactor 8 to drop out, but as the reed continues to vibrate its amplitude decreases, and it finally comes to rest with the contacts 15 and 16 closed. This short circuits the coil 10, deenergizing it and causing the contactor 8 to open its contacts 9, thus interrupting the shunt circuit and restoring the capacitor 1 to service. When the contactor 8 drops out it engages the reed 12 and restores it to its initial position with the contacts 15 and 16 open. Since opening of the contacts 9 interrupts the current through the transformer 11, however, the coil 10 remains deenergized and the contacts 9 remain open.

The vibrating reed 12 may be designed to vibrate for any desired time interval, thus keeping the capacitor shunted for the desired length of time. In most cases this period is preferably from 1½ to 3 seconds or possibly more, so as to keep the contacts 9 closed until the main gap 3 has had time to cool down sufficiently so that the arc will not restrike on normal voltage. This time interval is sufficiently long to permit a short circuit on the line to be cleared by the usual protective devices, but in case the short circuit still exists or an overload is still present when the contacts 9 open, the auxiliary gap 4 will immediately break down again and the operation of the system will be the same as before to shunt the capacitor and protect it from the dangerous overvoltage that would otherwise occur.

It will be seen therefore that a relatively simple and inexpensive protective system has been provided for the protection of series capacitors against overvoltage. The capacitor is protected immediately by the main gap device 3 when the voltage across it approaches a dangerous value, and the gap 3 is relieved by the contactor 8 immediately after it has broken down so as to avoid burning of the electrodes and other possible damage which might be caused by the arc between the electrodes. The contactor is held in for a definite short time interval and it is then opened automatically to restore the capacitor to service without requiring the use of expensive time delay relays.

It is to be understood that various modifications of the invention are possible. Thus, instead of the gap device 3 described above, a low pressure, enclosed gap having suitable breakdown and cut-off voltage characteristics of the type described in the copending application of J. Slepian and W. E. Berkey, Serial No. 358,634, filed September 27, 1940, may be utilized, and the auxiliary gap 4 and oscillatory circuit dispensed with, thus effecting a further simplification of the protective system. Similarly, any suitable type of vibratory timing device may be used to effect opening of the contacts 9 after a predetermined time interval, and any suitable arrangement may be used for normally holding the reed 12 stationary with its contacts open when the contactor is deenergized. Thus, it will be apparent that the invention is not limited to the exact arrangement shown and described for the purpose of illustration, but is capable of various other modifications and embodiments, and in its broadest aspects it includes all equivalent modifications which come within the scope of the appended claims.

I claim as my invention:

1. A series capacitor equipment for an alternating current line comprising a capacitor connected in series with the line, a main gap device for shunting the capacitor to by-pass the line current under excess-current conditions, shunting means responsive to said excess current for completing a shunt circuit around said gap device, and means for effecting interruption of said shunt circuit after a predetermined time interval, said last-mentioned means being started in operation substantially simultaneously with the operation of said shunting means.

2. A series capacitor equipment for an alternating current line comprising a capacitor connected in series with the line, a main gap device for shunting the capacitor to by-pass the line current under excess-current conditions, shunting means responsive to said excess current for completing a shunt circuit around said gap device, and a timing device for effecting interruption of said shunt circuit after a predetermined time interval, said timing device being set in operation substantially simultaneously with the operation of said shunting means.

3. A series capacitor equipment for an alternating current line comprising a capacitor connected in series with the line, a main gap device for shunting the capacitor to by-pass the line current under excess-current conditions, a contactor having its contacts connected in a shunt circuit around the gap device, said contactor having an operating coil, mean responsive to said excess current for energizing said coil to cause the contactor to close its contacts, and timing means for deenergizing said coil after a predetermined time interval, said timing means being set in operation substantially simultaneously with the closing of said contactor.

4. A series capacitor equipment for an alternating current line comprising a capacitor connected in series with the line, a main gap device for shunting the capacitor to by-pass the line current under excess-current conditions, a contactor having its contacts connected in a shunt circuit around the gap device, said contactor having an operating coil, means responsive to said excess current for energizing said coil to cause the contactor to close its contacts, and a timing device for sort-circuiting said coil to deenergize it after a predetermined time interval, said timing device being set in operation by the closing of said contactor.

5. A series capacitor equipment for an alternating current line comprising a capacitor connected in series with the line, a main gap device shunting the capacitor to limit the voltage across it, a contactor having its contacts connected in a shunt circuit around the gap device, said contactor having an operating coil, means for energizing said coil to cause the contactor to close its contacts when current flows in the gap circuit, a vibratory timing device, and means for causing said timing device to be set in vibration by closing of the contactor, said timing device being operative to short-circuit the contactor coil when it comes to rest after a definite time interval.

6. In combination with an alternating current line, a capacitor connected in series with the line, a main gap device shunting the capacitor to limit the voltage across it, a contactor having contacts connected in a shunt circuit around the gap device, said contactor having an operating coil, means for energizing said coil to cause the contactor to close its contacts and complete said shunt circuit when current flows in the gap circuit, a vibratory reed, and means for causing said vibratory reed to be set in vibration when the contactor closes its contacts, said vibratory reed carrying a contact which engages a stationary contact and short-circuits the contactor coil when the reed comes to rest after a predetermined time interval.

7. In combination with an alternating current line, a capacitor connected in series with the line, a main gap device shunting the capacitor to limit the voltage across it, a contactor having contacts connected in a shunt circuit around the gap device, said contactor having an operating coil, means for energizing said coil to cause the contactor to close its contacts and complete said shunt circuit when current flows in the gap circuit, a vibratory reed, and means for causing said vibratory reed to be set in vibration when the contactor closes its contacts, said vibratory reed carrying a contact which engages a stationary contact and short-circuits the contactor coil when the reed comes to rest after a predetermined time interval, said vibratory reed being held stationary with its contact separated from the stationary contact when the contactor coil is deenergized.

RALPH E. MARBURY.